United States Patent Office 3,211,562
Patented Oct. 12, 1965

3,211,562
OXALIC ACID-BIS-HYDROXYARYLAMIDES AS ULTRAVIOLET STABILIZERS FOR ORGANIC PLASTIC COMPOSITIONS
Hans Rudolf Biland, Basel, and Max Duennenberger, Birsfelden, Switzerland, assignors to Ciba Limited, Basel, Switzerland, a company of Switzerland
No Drawing. Filed July 5, 1962, Ser. No. 207,819
Claims priority, application Switzerland, July 6, 1961, 7,939/61
11 Claims. (Cl. 106—186)

The present invention provides a process for the protection of organic materials from ultraviolet rays, wherein an oxalic acid-bis-hydroxyarylamide of the general formula (1) 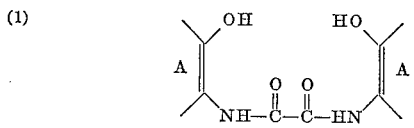

in which A represents a benzene radical, is incorporated with the organic material to be protected itself or with a substratum containing said material, or with a filter layer superimposed on the material to be protected, or is fixed on such material.

The oxalic acid-bis-hydroxyarylamides of the Formula 1 to be used in the present process are accessible by known methods: Oxalic acid or a functional derivative thereof is condensed on both sides with suitable arylamines of the benzene series containing a hydroxyl group in a position vicinal to the amino group. There may be used, for example, arylamines of the benzene series that contain a single benzene nucleus and may contain, in addition to the ortho-hydroxyamino groupings, further substituents, for example alkoxy groups 1 to 12 carbon atoms, halogen such as chlorine atoms, also hydrocarbon radicals with at least 1, for example 4, 8, 12 or more, carbon atoms, more especially alkyl groups which may be linear or branched, or cycloalkyl groups. As relevant examples there may be mentioned the following ortho-hydroxy-aminoaryl compounds of the benzene series:

1-amino-2-hydroxybenzene,
1-amino-2-hydroxy-5-methylbenzene,
1-amino-2-hydroxy-4-methylbenzene,
1-amino-2-hydroxy-5-isopropylbenzene,
1-amino-2-hydroxy-3:5-dimethylbenzene,
1-amino-2-hydroxy-5-isobutylbenzene,
1-amino-2-hydroxy-5-tertiary butylbenzene,
1-amino-2-hydroxy-5-methoxybenzene,
1-amino-2-hydroxy-5-chlorobenzene,
1-amino-2-hydroxy-5-dodecylbenzene,
1-amino-2-hydroxy-5-phenylbenzene and
1-amino-2-hydroxy-5-cyclohexylbenzene.

Good results are obtained by the present process, for example, with oxalic acid-bis-hydroxyarylamides of the Formula 1 which correspond to the formula (2) 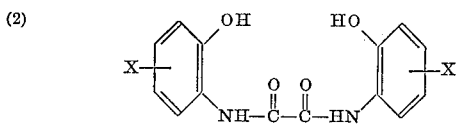

in which X represents hydrogen, chlorine, an alkyl group with 1 to 12 carbon atoms, phenyl or cyclohexyl.

The following enumeration contains a few typical compounds suitable for use in the present process:

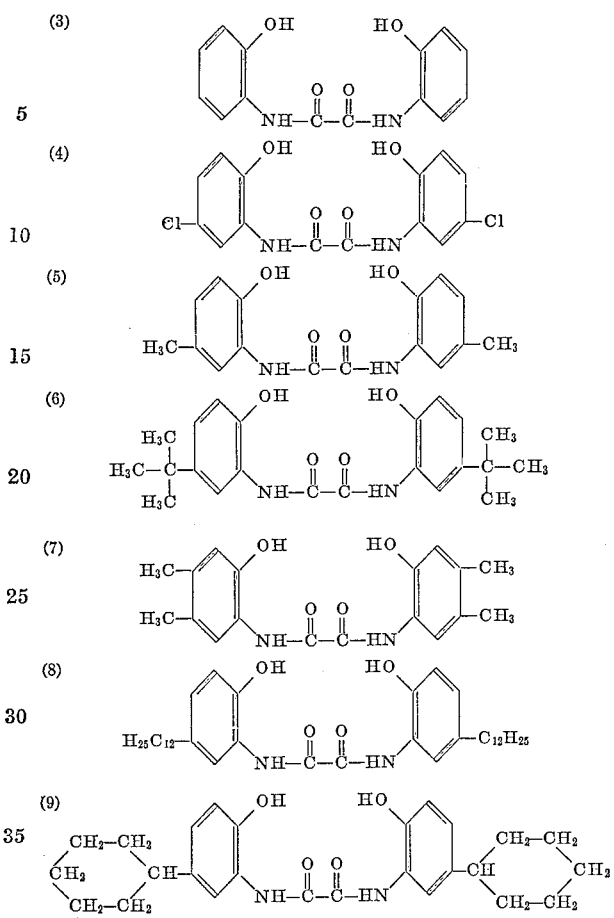

According to this invention the oxalic acid-bis-hydroxyarylamides of the composition defined above are used as light filters for a large variety of substances.

Quite generally, there are three different ways in which the new products may be used, singly or in combination:

(A) The light filter is incorporated with a substratum to protect it from the attack of ultraviolet rays, the purpose being to prevent one or more than one physical property, for example discoloration, impairment of the ultimate tensile strength, embrittlement or the like and/or chemical reactions caused by ultraviolet rays, for example oxidation processes. The incorporation may take place before or during the manufacture of the substratum, or subsequently by suitable methods, for example by way of a fixation process similar to a dyeing process.

(B) The light filter is incorporated with a substratum to protect one or several substances present in the substratum, for example dyestuffs, assistants or the like, which may be accompanied by the protection of the substratum mentioned under (A) above.

(C) The light filter is incorporated with a "filter layer" to protect a substratum placed immediately under the filter layer or at a distance from it (for example in a shop-window) from the attack of ultraviolet rays; the filter layer may be solid (film, foil, dressing) or semi-solid (cream, oil, wax).

As materials that can be protected there may be mentioned:

(a) Textile materials quite generally which may be in any desired form, for example in the form of fibers, filaments, yarns, woven or knitted fabrics or felt, and any finished products made therefrom; such textile materials may consist of:

Natural materials of animal origin, such as wool or silk, or of vegetable origin, such as cellulose materials of cotton, hemp, flax, linen, jute or ramie; also of semisynthetic materials, such as regenerated cellulose, for example rayon, viscoses, including spun rayon; or synthetic materials obtained by polymerisation or copolymerisation, for example polyacrylonitrile, polyvinyl chloride or poly-alpha-olefins, or materials obtained by polycondensation, such as polyesters and above all polyamides. In the case of semi-synthetic materials it is of advantage to incorporate the light filter with a spinning composition, for example a viscose spining composition, acetylcellulose spinning composition (including cellulose triacetate); in the case of masses to be used in the manufacture of fully synthetic fibers, such as polyamide melts or polyacrylonitrile spinning compositions, the light filter may be added thereto before, during or after the polycondensation or polymerisation respectively.

(b) Fibrous materials, other than textile materials, which may be of animal origin, such as feathers, hairs, also furs and skins and leather made therefrom by natural or chemical tanning, as well as finished products made therefrom; or they may be of vegetable origin, such as straw, wood, wood pulp; or fibrous materials consisting of densified fibers, such as paper, cardboard or chip board, as well as materials made from the latter. Furthermore paper stock for the manufacture of paper (for example Hollander pulp).

(c) Coatings and dressing agents for textile materials and paper, for example such as are based on starch or casein or on synthetic resins, for example vinyl acetate or derivatives of acrylic acid.

(d) Lacquers and films of different compositions, for example those of acetylcellulose, cellulose propionate, cellulose butyrate or cellulose mixtures, for example cellulose acetate+butyrate or cellulose acetate+propionate; furthermore nitrocellulose, vinyl acetate, polyvinyl chloride, copolymers of vinyl chloride and vinylidene chloride, alkyd lacquers, poly-alpha-olefins, such as polyethylene and polypropylene, polyamides, polyacrylonitrile, polyesters and the like. Another sphere of application of the oxalic acid-bis-hydroxyarylamides is their incorporation in wrapping materials, more especially the known, transparent foils of regenerated cellulose (viscose) or acetyl-cellulose. In this application it is as a rule advantageous to add the light filter to the mass from which these foils are made.

(e) Natural or synthetic resins, for example epoxy resins, polyester resins, vinyl resins, polystyrene resins, alkyd resins, aldehyde resins such as condensation products of phenol, urea or melamine with formaldehyde, as well as emulsions of synthetic resins (for example oil-in-water or water-in-oil emulsions). In this case it is of advantage to add the light filter before or during the polymerisation or poly-condensation respectively. There may also be mentioned synthetic resins reinforced with glass fibers as well as laminates made therefrom.

(f) Hydrophobic substances containing oil, fat or wax, such as candles, floor waxes, floor stains or other wood stains, furniture polishes, more especially those to be used for the treatment of light-colored, possibly bleached, wood surfaces.

(g) Natural, rubber-like materials such as rubber, balata, gutta-percha; or synthetic, vulcanisable materials, such as polychloroprene, olefinic polysulfides, polybutadiene or copolymers of butadiene+styrene (for example Buna S) or butadiene+acrylonitrile (for example Buna N), which materials may also contain fillers, pigments, vulcanisation accelerators and the like; the addition of the oxalic acid-bis-hydroxyarylamides has in this instance the purpose of delaying ageing and thus of preventing changes in the plasticity properties and the embrittlement of the material treated.

(h) Cosmetics, such as perfumes, dyed or undyed soaps and bath salts, skin and face creams, powders, repellants and more especially sunburn oils and creams.

(i) For the manufacture of filter layers for photographic purposes, more especially for use in color photography.

It will be readily understood that the oxalic acid-bis-hydroxyarylamides are not only suitable as light filters for undyed but also dyed or pigmented materials. In the latter case the additive affords protection from light attack also to the dyestuffs, whereby their fastness to light is in some cases very considerably enhanced. If desired, the treatment with the light filter may be combined with the dyeing or pigmenting process.

Depending on the type of material to be treated, the demands made on the efficiency and durability of the protection and other factors, the amount of light filter to be incorporated with said materials may vary within rather wide limits, for example from about 0.01 to 10%, preferably from 0.1 to 2%, of the weight of the material that is to be given direct protection from ultraviolet rays.

Unless otherwise indicated, parts and percentages in the following Manufacturing Instruction A and in the examples are by weight. Melting points shown are uncorrected.

MANUFACTURING INSTRUCTION A

The compounds of the Formulae 3, 4, 5 and 6 to be used as light filters according to the invention may be manufactured, for example, as follows:

*Compound of the Formula 3*

A mixture of 1 part of 1-amino-2-hydroxybenzene, 10 parts of oxalic acid diethyl ester and 5 parts of ethanol is refluxed for 2 hours, whereupon the ethanol and the excess oxalic acid diethyl ester are removed by distillation. The radical is the reaction product of the Formula 3. The analytically pure product obtained by two recrystallizations from acetone+ethanol melts at 290–291° C. with decomposition.

Analysis ($C_{14}H_{12}N_2O_4$):

|  | C, percent | H, percent |
| --- | --- | --- |
| Calculated | 61.76 | 4.44 |
| Found | 61.72 | 4.55 |

$\lambda_{max}=312$ m$\mu$ ($\epsilon=17,700$).

*Compound of the Formula 4*

14.5 parts of 1-amino-2-hydroxy-5-chlorobenzene and 7.4 parts of oxalic acid diethyl ester are suspended in 50 parts of xylene, and the whole is refluxed for 3 hours. The precipitated reaction product of the Formula 4 is filtered off and washed with 20 parts of benzene. The analytically pure product obtained by two recrystallizations from acetone+alcohol melts at 314–1316° C. with decomposition.

Analysis ($C_{14}H_{10}N_2O_4Cl_2$):

|  | C, percent | H, percent |
| --- | --- | --- |
| Calculated | 49.29 | 2.95 |
| Found | 49.52 | 2.97 |

$\lambda_{max}=274$ m$\mu$ ($\epsilon=10,600$).
$\lambda_{max}=320$ m$\mu$ ($\epsilon=16,500$).

*Compound of the Formula 5*

A mixture of 12.3 parts of 1-amino-2-hydroxy-5-methylbenzene, 4.5 parts of oxalic acid and 50 parts of xylene is refluxed for 1 hour. The water formed is removed by azeotropic distillation during the reaction. The precipitated reaction product of the Formula 5 is then filtered off and washed with 50 parts of benzene. The analytically pure product obtained by two recrystallizations from acetone+alcohol melts at 290–294° C.

Analysis ($C_{16}H_{16}N_2O_4$):

|  | C, percent | H, percent |
|---|---|---|
| Calculated | 63.99 | 5.37 |
| Found | 63.83 | 5.40 |

$\lambda_{max}=285\ m\mu\ (\epsilon=10{,}200)$.
$\lambda_{max}=320\ m\mu\ (\epsilon=16{,}100)$.

*Compound of the Formula 6*

A solution of 16.5 parts of 1-amino-2-hydroxy-5-tertiary butylbenzene in 500 parts of chloroform is refluxed, during which 6.6 parts of oxalic acid dichloride in 50 parts of chloroform are slowly added, and the reaction solution is then further refluxed for 15 minutes. The precipitated reaction product of the Formula 6 is filtered off and washed with a small amount of chloroform. The analytically pure product obtained by two recrystallizations from acetone+alcohol melts at 297–2198° C.

Analysis ($C_{22}H_{28}N_2O_4$):

|  | C, percent | H, percent |
|---|---|---|
| Calculated | 68.72 | 7.34 |
| Found | 68.83 | 7.13 |

$\lambda_{max}=318\ m\mu\ (\epsilon=15{,}800)$.

The following oxalic acid-bis-hydroxyarylamides, suitable for use in the present process, are accessible by an analogous condensation:

(7) 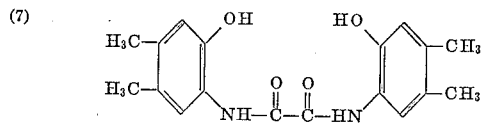

Recrystallized from dimethylformamide+glacial acetic acid: Melting point, 322° C. with decomposition.

Analysis ($C_{18}H_{20}N_2O_4$):

|  | C, percent | H, percent |
|---|---|---|
| Calculated | 65.84 | 6.15 |
| Found | 65.76 | 6.07 |

$\lambda_{max}=288\ m\mu\ (\epsilon=10{,}350)$.
$\lambda_{max}=324\ m\mu\ (\epsilon=17{,}550)$.

(8) 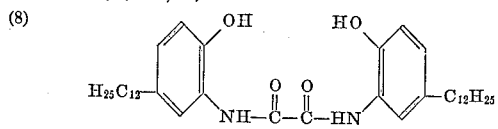

Recrystallized from acetone+ethanol: Melting point, 239–240° C.

Analysis ($C_{38}H_{60}N_2O_4$):

|  | C, percent | H, percent |
|---|---|---|
| Calculated | 74.95 | 9.93 |
| Found | 74.03 | 9.73 |

$\lambda_{max}=319\ m\mu\ (\epsilon=16{,}500)$.

(9) 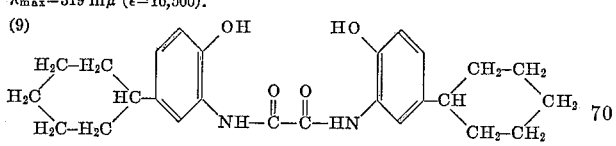

Recrystallized from dimethylformamide+ethanol: Melting point, 310° C. with decomposition.

Analysis ($C_{26}H_{32}N_2O_4$):

|  | C, percent | H, percent |
|---|---|---|
| Calculated | 71.53 | 7.39 |
| Found | 71.85 | 7.35 |

$\lambda_{max}=283\ m\mu\ (\epsilon=9{,}950)$.
$\lambda_{max}=319\ m\mu\ (\epsilon=15{,}400)$.

(10) 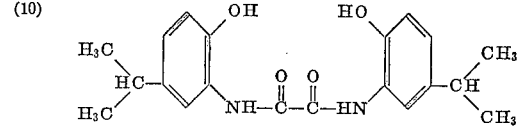

Recrystallized from acetone+ethanol: Melting point, 268° C. with decomposition.

Analysis ($C_{20}H_{24}N_2O_4$):

|  | C, percent | H, percent |
|---|---|---|
| Calculated | 67.39 | 6.79 |
| Found | 67.24 | 6.75 |

$\lambda_{max}=285\ m\mu\ (\epsilon=10{,}250),\ (\epsilon=15{,}750)$.

(11) 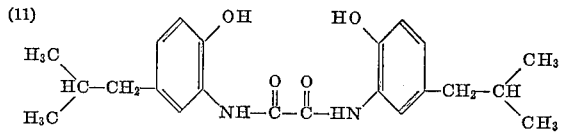

Recrystallized from acetone+ethanol: Melting point, 257–260° C.

Analysis ($C_{22}H_{28}N_2O_4$):

|  | C, percent | H, percent |
|---|---|---|
| Calculated | 68.72 | 7.34 |
| Found | 68.11 | 7.08 |

$\lambda_{max}=319\ m\mu\ (\epsilon=14{,}600)$.

(12) 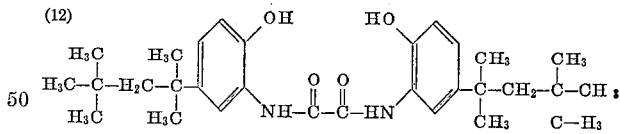

Recrystallized from acetone+ethanol: Melting point, 302° C. with decomposition.

Analysis ($C_{30}H_{46}N_2O_4$):

|  | C, percent | H, percent |
|---|---|---|
| Calculated | 72.25 | 9.30 |
| Found | 72.05 | 8.88 |

$\lambda_{max}=316\ m\mu\ (\epsilon=11{,}450)$.

(13) 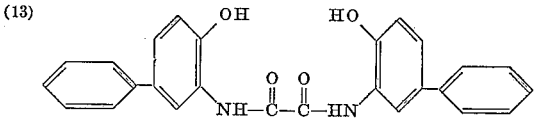

Recrystallized from dimethylformamide+ethanol: Melting point, 340° C. with decomposition.

Analysis ($C_{26}H_{20}N_2O_4$):

|  | C, percent | H, percent |
|---|---|---|
| Calculated | 73.57 | 4.75 |
| Found | 73.84 | 4.65 |

$\lambda_{max}=327\ m\mu\ (\epsilon=14{,}600)$.

(14) 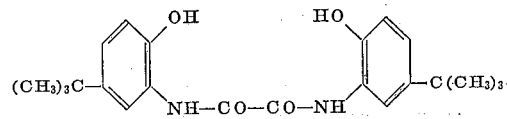

Recrystallized from acetone+ethanol: Melting point, 263–265° C. with decomposition.

Analysis ($C_{16}H_{16}N_2O_6$):

|  | C, percent | H, percent |
|---|---|---|
| Calculated | 57.83 | 4.85 |
| Found | 57.71 | 4.80 |

$\lambda_{max}=227\ m\mu\ (\epsilon=16{,}500)$.
$\lambda_{max}=253\ m\mu\ (\epsilon=13{,}400)$.
$\lambda_{max}=333\ m\mu\ (\epsilon=14{,}200)$.

EXAMPLE 1

A film about 40µ thick is manufactured from an acetonic solution of acetylcellulose of 10% strength which contains, calculated from the acetylcellulose, 1% of the compound of the Formula 3, 4, 5 or 6. After drying, the film reveals the following values for the light permeability expressed in percent:

| Wavelength in mµ | Permeability to light in percent | | | |
|---|---|---|---|---|
|  | (3) | (4) | (5) | (6) |
| 280 to 320 | 0 | 0 | 0 | 0 |
| 330 | 8 | 0 | 0 | 2 |
| 340 | 35 | 2.5 | 1 | 5 |
| 350 | 70 | 11 | 5 | 13 |
| 360 | 80 | 31 | 18 | 24 |
| 370 | 84 | 57 | 40 | 50 |
| 380 | 86 | 76 | 65 | 67 |
| 390 | 88 | 84 | 80 | 79 |

EXAMPLE 2

10,000 parts of a polyamide (in chip form) prepared in known manner from hexamethylenediamine adipate are mixed with 30 parts of titanium dioxide (rutile modification) and 50 parts of the compound of the Formula 4 or 6 in a tumbler for 12 hours. The chips treated in this manner are then melted in a boiler from which the atmospheric oxygen has been displaced by superheated steam and which is maintained by means of oil heating at 300 to 310° C., and the melt is stirred for ½ hour. The melt is then expressed through a spinneret under a nitrogen pressure of 5 atmospheres (gauge), and the resulting, cooled filament is wound up on a spinning bobbin. The ultimate tensile strength of the resulting filaments after stretching is much less adversely affected by light than is a filament which has been manufactured in identical manner, except that the compound of the Formula 4 or 6 has been omitted.

EXAMPLE 3

A paste of 100 parts of polyvinyl chloride, 3 parts of stabilizer, 59 parts by volume of dioctylphthalate and 0.2 part of the compound of the Formula 6, is made into a foil on a calender heated at 150–155° C. The polyvinyl chloride foil obtained in this manner displays complete ultraviolet absorption in the wavelength range of 280 to 360 mµ.

Instead of the compound of the Formula 6 there may be used one of the compounds of the Formula 7, 8, 10, 11 or 12.

EXAMPLE 4

1.0 part of the compound of the formula (6) 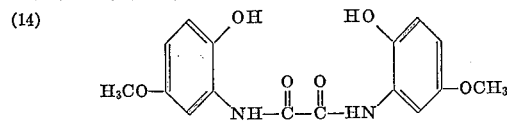

is dissolved in 100 parts by volume of sodium hydroxide solution of 3% strength and 100 parts by volume of ethanol. 3000 parts of water and 3 parts of an aqueous solution of the adduct of 35 mols of ethylene oxide and 1 mol of stearyl alcohol are then added. The resulting solution is neutralized with sulfuric acid of 10% strength while checking with a potentiometer until the pH value is 7, during which a fine dispersion forms. There are then immersed in this bath 100 parts of a fabric of polyamide fibers prepared from hexamethylenediamine and adipic acid at room temperature. The bath is slowly raised to the boil and the fabric is treated at the boil for one hour longer, then taken out of the bath, rinsed in cold water and dried.

After having been exposed for 100 hours to the light of a xenon lamp, the material so treated displays a much smaller loss in ultimate tensile strength than when the compound of the Formula 6 is not added.

Similar, good results are obtained by using the compound of the Formula 4 instead of the compound of the Formula 6.

EXAMPLE 5

A paper stock is prepared in a Hollander from 150 parts of bleached sulfite or sulfate cellulose,
60 parts of zinc sulfide,
6 parts of aluminum sulfate,
3 parts of a finely dispersed aqueous paste containing 30% of the azo pigment of the formula

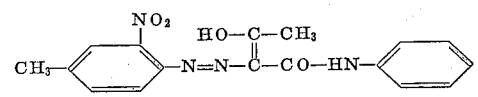

5000 parts of water.

A fancy paper made from this stock is covered with an untreated tissue or overlay paper and immersed in a bath prepared from 100 parts of a pulverulent, curable, water-soluble condensation product of 1 mol of melamine and about 2 mols of formaldehyde, and
100 parts of a mixture prepared from a solution of 0.5 part of the compound of the Formula 6, in 19.5 parts of dimethylformamide by dilution with 80 parts of water.

After having removed the excess resin solution from the paper it is dried.

The fancy paper treated in this manner is pressed together with the treated tissue paper used as an overlay on a substratum consisting of one sheet of phenol paper and blocking sheets impregnated with melamine resin, which are used as interlay, for 10 minutes at 140 to 150° C. under a pressure of 100 kg. per cm.².

After exposure under a fadeometer the resulting laminate possesses much better fastness to light than a comparable product that does not contain the compound of the Formula 6.

EXAMPLE 6

A mixture of 100 parts of polyethylene ("Alkathene WNG 14") and 0.2 part of the compound of Formula 6 is made into a foil on a calender heated at 130 to 140° C. and pressed at 130° C.

The foil obtained in this manner is practically impermeable for ultraviolet light in the wavelength range of 280 to 380 mµ.

Instead of the compound of the Formula 6 there may be used the compound of the Formula 5.

In an analogous manner polypropylene may be used instead of polyethylene, similar results being obtained.

What is claimed is:

1. A poly-alpha-olefin composition containing from 0.1% to 10% by weight of an oxalic acid-bis-hydroxyarylamide of the formula

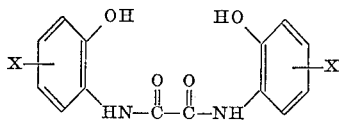

wherein X is selected from hydrogen, chlorine, alkyl with 1 to 12 carbon atoms, phenyl and cyclohexyl, as an agent to inhibit deterioration of said polyolefin composition by ultraviolet rays.

2. A polyethylene composition containing from 0.01% to 10% by weight of an oxalic acid-bis-hydroxyarylamide of the formula

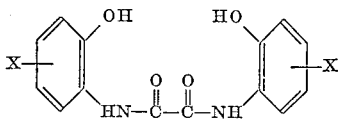

wherein X is selected from hydrogen, chlorine, alkyl with 1 to 12 carbon atoms, phenyl and cyclohexyl, as an agent to inhibit deterioration of said polyethylene composition by ultraviolet rays.

3. A polypropylene composition containing from 0.01% to 10% by weight of an oxalic acid-bis-hydroxyarylamide of the formula

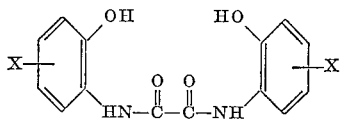

wherein X is selected from hydrogen, chlorine, alkyl with 1 to 12 carbon atoms, phenyl and cyclohexyl, as an agent to inhibit deterioration of said polypropylene composition by ultraviolet rays.

4. A polyvinyl chloride composition containing from 0.01% to 10% by weight of an oxalic acid-bis-hydroxyarylamide of the formula

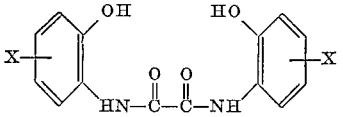

where X is selected from hydrogen, chlorine, alkyl with 1 to 12 carbon atoms, phenyl and cyclohexyl, as an agent to inhibit deterioration of said polyvinyl chloride composition by ultraviolet rays.

5. A polyamide composition containing from 0.01% to 10% by weight of an oxalic acid-bis-hydroxyarylamide of the formula

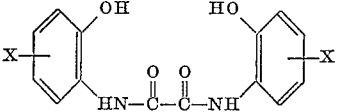

wherein X is selected from hydrogen, chlorine, alkyl with 1 to 12 carbon atoms, phenyl and cyclohexyl, as an agent to inhibit deterioration of said polyamide composition by ultraviolet rays.

6. An acetyl cellulose composition containing from 0.01% to 10% by weight of an oxalic acid-bis-hydroxyarylamide of the formula

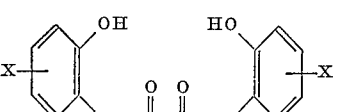

wherein X is selected from hydrogen, chlorine, alkyl with 1 to 12 carbon atoms, phenyl and cyclohexyl, as an agent to inhibit deterioration of said acetyl cellulose composition by ultraviolet rays.

7. A polyethylene composition containing 0.2% by weight of the oxalic acid-bis-hydroxyarylamide of the formula

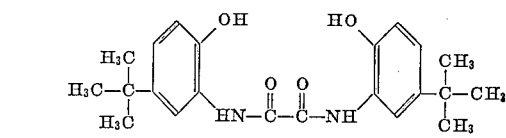

as an agent to inhibit deterioration of said polyethylene composition by ulutraviolet rays.

8. A polyvinyl chloride composition containing therein 0.2% by weight of the oxalic acid-bis-hydroxyarylamide of the formula

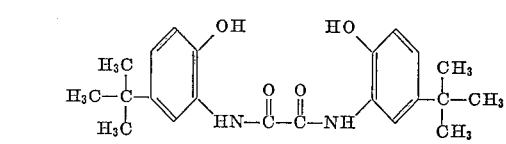

as an agent to inhibit deterioration of said polyvinyl chloride composition by ultraviolet rays.

9. An acetyl cellulose composition containing therein 1% by weight of the oxalic acid-bis-hydroxyarylamide of the formula

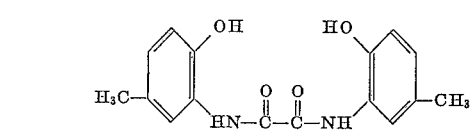

as an agent to inhibit deterioration of said acetyl cellulose composition by ultraviolet rays.

10. A polyamide composition containing 0.5% by weight of the oxalic acid-bis-hydroxyarylamide of the formula

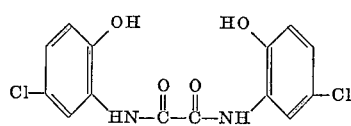

as an agent to inhibit deterioration of said polyamide composition by ultraviolet rays.

11. An organic plastic film-forming composition containing from 0.01% to 10% by weight of an oxalic acid-bis-hydroxyarylamide of the formula

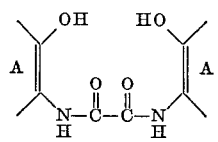

wherein A stands for a benzene radical, as an agent inhibiting deterioration of said organic plastic film-forming composition by ultraviolet rays.

References Cited by the Examiner

UNITED STATES PATENTS

| | | | |
|---|---|---|---|
| 2,683,132 | 7/54 | Young et al. | 106—186 |
| 2,758,982 | 8/56 | Wicklatz et al. | 260—45.9 |
| 2,879,823 | 3/59 | Smith | 260—45.9 |

ALEXANDER H. BRODMERKEL, *Primary Examiner*.

LESLIE H. GASTON, MORRIS LIEBMAN, *Examiners*.

UNITED STATES PATENT OFFICE
CERTIFICATE OF CORRECTION

Patent No. 3,211,562

October 12, 1965

Hans Rudolf Biland et al.

It is hereby certified that error appears in the above numbered patent requiring correction and that the said Letters Patent should read as corrected below.

Column 9, line 5, for "0.1%" read -- 0.01% --; column 10, line 16, for "ulutraviolet" read -- ultraviolet --.

Signed and sealed this 12th day of July 1966.

(SEAL)
Attest:

ERNEST W. SWIDER
Attesting Officer

EDWARD J. BRENNER
Commissioner of Patents